(12) United States Patent
Buechner et al.

(10) Patent No.: US 12,545,769 B2
(45) Date of Patent: Feb. 10, 2026

(54) MULTILAYER COMPOSITES OF PRINTED FILMS

(71) Applicant: Covestro Deutschland AG, Leverkusen (DE)

(72) Inventors: Joerg Buechner, Bergisch Gladbach (DE); Harald Kraus, Leverkusen (DE); Thomas Fait, Cologne (DE); Christoph Thiebes, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 253 days.

(21) Appl. No.: 18/278,039

(22) PCT Filed: Feb. 18, 2022

(86) PCT No.: PCT/EP2022/054030
§ 371 (c)(1),
(2) Date: Aug. 21, 2023

(87) PCT Pub. No.: WO2022/175424
PCT Pub. Date: Aug. 25, 2022

(65) Prior Publication Data
US 2024/0124663 A1    Apr. 18, 2024

(30) Foreign Application Priority Data

Feb. 22, 2021 (EP) .................... 21158330

(51) Int. Cl.
| | |
|---|---|
| B32B 7/12 | (2006.01) |
| B32B 15/09 | (2006.01) |
| B32B 15/20 | (2006.01) |
| B32B 27/16 | (2006.01) |
| B32B 27/36 | (2006.01) |
| B32B 37/24 | (2006.01) |
| B65D 65/40 | (2006.01) |
| B65D 81/34 | (2006.01) |
| C08J 5/12 | (2006.01) |
| C08J 7/04 | (2020.01) |
| C09D 175/12 | (2006.01) |
| C09J 175/12 | (2006.01) |

(52) U.S. Cl.
CPC ................ *C08J 5/127* (2013.01); *B32B 7/12* (2013.01); *B32B 15/09* (2013.01); *B32B 15/20* (2013.01); *B32B 27/16* (2013.01); *B32B 27/36* (2013.01); *B32B 37/24* (2013.01); *B65D 65/40* (2013.01); *B65D 81/3415* (2013.01); *C08J 7/0427* (2020.01); *C09D 175/12* (2013.01); *C09J 175/12* (2013.01); *B32B 2037/243* (2013.01); *B32B 2250/02* (2013.01); *B32B 2255/10* (2013.01); *B32B 2255/26* (2013.01); *B32B 2255/28* (2013.01); *B32B 2307/306* (2013.01); *B32B 2307/4023* (2013.01); *B32B 2307/54* (2013.01); *B32B 2307/542* (2013.01); *B32B 2311/24* (2013.01); *B32B 2367/00* (2013.01); *B32B 2375/00* (2013.01); *B32B 2439/46* (2013.01); *B32B 2439/70* (2013.01); *C08J 2367/02* (2013.01); *C08J 2475/12* (2013.01); *C08J 2479/08* (2013.01)

(58) Field of Classification Search
CPC .................................. B32B 7/12; B32B 27/40
See application file for complete search history.

(56) References Cited

U.S. PATENT DOCUMENTS

| | | | |
|---|---|---|---|
| 4,857,565 A | 8/1989 | Henning et al. | |
| 6,235,384 B1 | 5/2001 | Voss et al. | |
| 6,642,343 B2 | 11/2003 | Gilles et al. | |
| 9,669,610 B2 | 6/2017 | Meyer et al. | |
| 2006/0167205 A1 | 7/2006 | Eugene et al. | |
| 2006/0211838 A1 | 9/2006 | Eugene et al. | |
| 2015/0239222 A1* | 8/2015 | Meyer ............... | C08G 18/4009 |
| | | | 156/332 |
| 2016/0376438 A1* | 12/2016 | Grablowitz ........... | C09J 175/08 |
| | | | 524/591 |
| 2018/0362785 A1* | 12/2018 | Arai ....................... | C08L 75/06 |

FOREIGN PATENT DOCUMENTS

| | | |
|---|---|---|
| DE | 60100208 T2 | 3/2004 |
| DE | 202004019009 U1 | 5/2005 |
| DE | 60301623 T2 | 3/2006 |
| DE | 60302141 T2 | 8/2006 |
| DE | 102017204525 A1 | 9/2017 |
| EP | 0232778 A2 | 8/1987 |
| EP | 2788447 B1 | 9/2015 |
| EP | 2914642 B1 | 1/2017 |
| EP | 3395570 A1 | 10/2018 |

OTHER PUBLICATIONS

EP-1853639-B1 (Year: 2015).*

* cited by examiner

*Primary Examiner* — Elizabeth E Mulvaney
(74) *Attorney, Agent, or Firm* — Donald R. Palladino; Richard P. Bender

(57) ABSTRACT

The invention relates to a multilayer composite, containing a first polymeric layer which on a side is coated with a printing ink containing a polyurethane as binder, and a second layer which with a polyurethane dispersion as adhesive is joined at least partly with the side of the first polymeric layer which is coated with the printing ink containing a polyurethane as binder.

11 Claims, No Drawings

MULTILAYER COMPOSITES OF PRINTED FILMS

CROSS-REFERENCE TO RELATED APPLICATIONS

This application is the United States national phase of International Application No. PCT/EP2022/054030 filed Feb. 18, 2022, and claims priority to European Patent Application No. 21158330.7 filed Feb. 22, 2021, the disclosures of which are hereby incorporated by reference in their entireties.

BACKGROUND OF THE INVENTION

Field of the Invention

The present invention relates to a multilayer laminate at least containing a first polymeric layer which is coated on at least one side with at least one printing ink containing at least one polyurethane as binder and a second layer which is at least partially bonded, using a polyurethane dispersion as adhesive, to the side of the first polymeric layer coated with at least one printing ink containing at least one polyurethane as binder, to a process for producing the multilayer laminate at least comprising the steps of (A) providing at least a first polymeric layer which is coated on at least one side with at least one printing ink containing at least one polyurethane as binder, (B) applying a polyurethane dispersion as adhesive to the first polymeric layer and (C) contacting the first polymeric layer from step (B) with at least one second layer to obtain the multilayer laminate, to the use of the multilayer laminate for packaging foodstuffs or feedstuffs and to a packaging containing a corresponding multilayer laminate.

Description of Related Art

Multilayer laminates for packaging foodstuffs are known per se, see for example "Polyurethanes: Coatings, Adhesives and Sealants", Meier-Westhues, ISBN 9783866307827, pages 325 to 331. Packagings made of multilayer laminates often have on their outside, i.e. on the side of the packaging that is visible to the observer, a transparent film that is printed on the inside. This is also known as reverse printing or inner ply printing. The printing ink is applied to the inner ply to protect the print from a mechanical damage. In addition the print appears more brilliant on the inside of a polyester film for example, thus making the packaging or the packaged foodstuff appear of higher quality.

As well as the aspect of positive product representation, inner ply printing is also necessary to make information about the packaged foodstuff, about the nutritional information or about the shelf life of the packaged foodstuff visible for the retailer and the consumer. The printing of the film may be carried out by flexographic printing or intaglio printing processes. Typical films therefor consist of polyester, polypropylene or polyamide for example.

Printing inks for multilayer laminates are generally solvent-containing. They generally contain not only about 70% by weight for example of solvent but also about 10% by weight for example of at least one pigment and about 15% by weight for example of at least one film-forming binder. Further constituents are auxiliaries and additives, for example wetting agents, deaerators etc., for adapting the printing ink to the printing process and to the substrate to be printed. Typical binders for solvent-based printing inks include nitrocellulose, polyvinyl chloride, polyvinyl butyral and polyurethane. Mixtures of binders are also possible. Printing inks based on polyurethane may optionally also be processed with co-use of crosslinker isocyanates.

If a multilayer laminate is used for packaging foodstuffs which during or after packaging are exposed to or exhibit high temperatures the printing ink employed must also be stable at these high process temperatures, i.e. the printing ink must not undergo decomposition or changes in color at high temperatures. Examples of treatments at high temperature include for example heating or cooking of the foodstuff in the packaging, so-called boil-in-bag, so-called hot-filling of the foodstuff, or steam sterilization of the foodstuff or feedstuff after filling into the multilayer laminate, the so-called retort process.

In addition to the printing technology aspects and the thermal stability of the binders employed in printing inks there is a basic desire in the market to employ only halogen-free printing inks, adhesives, coatings and films for the packaging foodstuffs. It is for this reason that recent years have seen the development of printing inks containing the binder polyurethane. These printing inks are today preferably employed for multilayer laminates exposed to high temperatures.

Furthermore, polyurethane dispersions are employed as adhesives in the production of multilayer laminates, so-called lamination. These polyurethane dispersions are known to those skilled in the art.

EP 2 788 447 B1 describes the use of aqueous polyurethane dispersions for laminate film lamination, wherein the polyurethane is constructed to an extent of at least 10% by weight of at least one amorphous polyester polyol and the polyurethane dispersion contains at least one external crosslinker. This external crosslinker is a polyisocyanate having at least two isocyanate groups. The polyurethane in the aqueous dispersion is preferably neutralized with ammonia. The film material for producing the multilayer laminates is selected from the group consisting of aluminum foil, printed polyester film, unprinted polyester film, printed polyamide film, unprinted polyamide film, polypropylene film, polyethylene film and combinations thereof. The laminate films disclosed are also suitable for highly resilient laminate films which are used in particular for retort applications, in particular steam sterilization or pasteurization, and for hot-filling applications. However, the recited document gives no indication of the binders employed in the printing ink. One disadvantage of the adhesive employed according to this document is the 2K (2-component) processing. The polyisocyanate must be added immediately before use of the polyurethane dispersion. Thus, the operating steps "adhesive production" and "processing" cannot be temporally separated.

U.S. Pat. No. 6,235,384 B1 discloses a laminate comprising two flexible films bonded with a curable adhesive. The adhesive is formed by mixing two components immediately before use, wherein one component is at least one polyurethane having at least one carboxylic acid or sulfonic acid group. The carboxylic acid or sulfonic acid groups are neutralized with ammonia. The second component is a crosslinking agent for the polyurethane polymer. It contains numerous carbodiimide, aziridine or epoxy groups. The recited laminates may also be used in hot-fill or boil-in-bag processes. The cited document does not make reference to printed films. One disadvantage of this process is likewise the requirement of 2-component processing.

The decoupling of the addition of crosslinker to the polyurethane dispersion from the lamination process, i.e. the avoidance of a 2-component procedure, is economically advantageous because this makes it possible, for example in case of an interruption of the lamination process, for the adhesive to be removed again from the adhesive reservoir of the lamination plants and reused at a later point in time. In the case of 2-component processing according to the prior art up to 20% by weight of the adhesive may become waste in high-speed lamination plants in industrial manufacturing processes. This waste is economically and ecologically problematic.

SUMMARY OF THE INVENTION

It is accordingly an object of the present invention to provide multilayer laminates, in particular for the packaging of foodstuffs, wherein the multilayer laminates shall be printed with polyurethane-based printing inks and in particular shall be suitable for packaging of foodstuffs or feedstuffs, in particular in boil-in-bag, hot-filling and retort applications. The adhesives used for the film lamination shall further be halogen-free and be amenable to 1K (1-component) processing.

According to the invention these objects are achieved by a multilayer laminate at least containing a first polymeric layer which is coated on at least one side with at least one printing ink containing at least one polyurethane as binder and a second layer which is at least partially bonded, using a polyurethane dispersion as adhesive, to the side of the first polymeric layer coated with at least one printing ink containing at least one polyurethane as binder.

The multilayer laminate according to the invention comprises at least one first polymeric layer which is coated on at least one side with at least one printing ink containing at least one polyurethane as binder.

According to the invention the multilayer laminate may comprise not only this first polymeric layer but also further layers which are bonded at least partially but preferably over their whole area to the first polymeric layer and/or to further layers present. According to the invention the multilayer laminate contains 1 to 6 further layers in addition to the first polymeric layer.

DESCRIPTION OF THE INVENTION

The first polymeric may generally contain, preferably consist of, any material appearing suitable to those skilled in the art. In the multilayer laminate according to the invention the material of the at least one first polymeric layer is preferably selected from polyethylene (PE), polypropylene (PP), polyamide (PA), polyesters, polyacetate, cellophane, polylactide (PLA) and mixtures thereof. According to the invention the first polymeric layer particularly preferably consists of polyethylene terephthalate, polypropylene or polyamide; more preferably the first polymeric layer is a polyethylene terephthalate, polypropylene or polyamide film.

If according to the invention a polyethylene or polypropylene film is employed as the first polymeric layer this is generally contains a lubricant, for example oleamide and/or erucamide. This has the advantage of avoiding a tearing or stretching of the film at high belt speeds during the lamination processes or during further processing into the packaging.

The first polymeric layer present according to the invention generally has a thickness of 5 to 200 μm, preferably 12 to 60 μm.

Optional further layers present may likewise contain or consist of polymeric materials. Suitable polymeric materials for the optionally present further layers are selected from polymeric materials, in particular film selected from polyethylene (PE), in particular LDPE, LLDPE, HDPE, polypropylene (PP), in particular in the form of unoriented film (cPP), uniaxially oriented film (oPP) or biaxially oriented film (BOPP), from polyamide (PA), polyesters, in particular polyethylene terephthalate (PET), polyacetate, cellophane, polylactide (PLA) and mixtures thereof. According to the invention the optionally present further layers particularly preferably consist of polyethylene terephthalate, polypropylene or polyamide; more preferably the optionally present further layers are polyethylene terephthalate, polypropylene or polyamide films. The optionally present further layers may optionally be provided with a lubricant as described above. The optionally present further layers may optionally be formed from further non-polymeric materials, for example metals, in particular aluminum, or paper or combinations thereof.

The further layers optionally present according to the invention generally have a thickness of 5 to 200 μm, preferably 12 to 60 μm, if they contain or consist of polymeric material. The further layers optionally present according to the invention generally have a thickness of 5 to 100 μm, preferably 9 to 15 μm, if they contain or consist of a metal, in particular aluminum. An optionally present layer composed of paper generally has a thickness of 5 to 200 μm, preferably between 10 to 50 μm.

The dimensions of the first polymeric layer and/or the optionally present further layers are not limited according to the invention but rather are informed by the use of the multilayer laminate according to the invention, for example as packaging of foodstuffs or feedstuffs. The present invention relates not only to the multilayer laminate according to the invention as a roll material, for example before foodstuffs or feedstuffs are packaged with the multilayer laminate according to the invention, in particular as raw material having dimensions known to those skilled in the art, but also to the foodstuffs or feedstuffs, likewise in the dimensions known to those skilled in the art.

The optionally present further layers may be transparent or nontransparent, i.e. dyed with known dyes for example. The optionally present further layers may moreover be printed or unprinted.

The first polymeric layer is according to the invention coated on at least one side with at least one printing ink containing at least one polyurethane as binder.

In the context of the present invention the first polymeric layer is preferably printed on at least one side, optionally on both sides, with at least one printing containing at least one polyurethane as binder. According to the invention this print may wholly or partially, preferably partially, cover the printed side of the first polymeric layer.

Printing inks containing at least one polyurethane as binder are known per se to those skilled in the art and described for example in DE 60301623 T2, DE 60302141 T2 or DE 60100208 T2.

Polyurethanes suitable as binders are in particular obtainable by reacting an excess of one or more aliphatic diisocyanates with a group of isocyanate-reactive components consisting of one or more polyether polyols each having an average molecular weight in the range from not more than 2000 g/mol and at least one diamine to obtain a prepolymer and a mixture of isophoronediamine and a second diamine selected from the group consisting of ethylenediamine, 1,2-diaminocyclohexane and 2,2,4- or 2,4,4-trimethyl-diaminohexane (TMDA) in excess with respect to the free NO groups of the prepolymer.

Examples of aliphatic diisocyanates are straight-chain aliphatic, branched-chain aliphatic or cycloaliphatic diisocyanates. The diisocyanate preferably comprises 1 to 10 carbon atoms. Examples of preferred diisocyanates are 1,4-diisocyanatobutane, 1,6-diisocyanatohexane, 1,5-diisocyanato-2,2-dimethylpentane, 4-trimethyl-1,6-diisocyanatohexane, 1,10-diisocyanatodecane, 1,3- and 1,4-diisocyanatocyclohexane, 1-isocyanato-5-isocyanatomethyl-3,3,5-trimethylcyclohexane (isophorone diisocyanate (IPDI)), 2,3-, 2,4- and 2,6-diisocyanato-1-methylcyclohexane, 4,4'- and 2,4'-diisocyanatodicyclohexylmethane, 1-iso-cyanato-3-(4)isocyanatomethyl-1-methylcyclohexane, 4,4'- and 2,4'-diisocyanatodiphenylmethane and mixtures thereof or 2,2,4- or 2,4,4-trimethyldiisocyanatohexane (TMDI).

Preferably employable polyether polyol components of the polyurethane conform for example to the formula

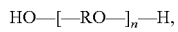

HO—[—RO—]$_n$—H, wherein R is a straight-chain or branched-chain $C_2$ to $C_{10}$ hydrocarbon group. R is preferably an alkylene group comprising 2 to 4 carbon atoms.

Examples of preferred polyether polyols include polyethylene ether glycols (PEG), polypropylene ether glycols (PPG) and polytetramethylene ether glycols (poly-THF) or a mixture thereof. The use of poly-THF is particularly preferred. In the above formula n is selected such that the average molecular weight of the polyether polyols is not more than 2000 g/mol, preferably less than 1500 g/mol and particularly preferably 1000 g/mol or less. A particularly preferred polyether polyol of the present invention is poly-THF 1000.

As a further isocyanate-reactive component at least one diamine is added. The diamine may be any aliphatic, cycloaliphatic, aromatic or heterocyclic diamine having primary or secondary amino groups. Examples include ethylenediamine, 1,2-diaminopropane, 1,3-diaminopropane, diaminobutane, hexamethylenediamine, 1,4-diaminocyclohexane, 3-aminomethyl-3,5,5-trimethylcyclohexylamine (isophoronediamine), m-xylenediamine or 1,3-bis(aminomethyl)cyclohexane. Isophoronediamine is particularly preferred.

Further isocyanate-reactive constituents that may be added include one or more polyols having an average molecular weight of not more than 800 g/mol, for example 1,4-butanediol, 1,6-hexanediol, neopentyldiol, dihydroxypolyether polyols, polyester polyols or the like.

The one or more diisocyanates and the isocyanate-reactive components are reacted to afford a first isocyanate-terminated prepolymer. The ratio of equivalent weights of diisocyanate components to isocyanate-reactive components is preferably 3.6:1 to 1.1:1, preferably 2:1 to 1.1:1.

The isocyanate-reactive components may be added to the isocyanate(s) simultaneously or sequentially. In the case of a sequential addition of the isocyanate-reactive constituent it is preferable to initially effect addition of the polyether polyol constituents followed by addition of the diamine constituent(s) and optionally by addition of the at least one polyol. The reaction is performed under the conditions well known to those skilled in the art. The reaction may be performed in the presence of a solvent using known catalysts.

Example of suitable solvents include alkyl acetates, for example methyl acetate, ethyl acetate, propyl acetate, butyl acetate and pentyl acetate. The total amount of the solvent is typically 0% to 90% of the reaction mixture, preferably 25% to 60% by weight of the reaction mixture.

A catalyst may be used to accelerate the reaction of the diisocyanate with the diol. Suitable catalysts include tin derivatives, for example tin octylate, tin oxalate, dibutyltin dilaurate, zinc derivatives such as for example zinc acetate, zinc bisacetylacetonate or organotitanium compounds such as for example tetrabutyl titanate or mixtures thereof.

Further additives or additives may be present. It is possible to add an antioxidant such as Irganox 1076 (octadecyl-3,5-di-t-butyl-4-hydroxyhydrocinnamate for example).

The formation of the isocyanate-terminated prepolymer is generally performed at a temperature of 0° C. to 130° C., preferably 50° C. to 90° C. The reaction time is, for example, 1 to 12 hours, preferably 1 to 4 hours.

The resulting isocyanate-terminated prepolymer is preferably chain-extended with a mixture of isophoronediamine (IPDA) and a second diamine selected from the group consisting of ethylenediamine (EDA), 1,2-diaminocyclohexane and 2,2,4- or 2,4,4-trimethyldiaminohexane (TMDA). The ratio of the second diamine to IPDA is 10:1 to 2:1, in particular 5:1 to 3:1. The ratio of equivalent weights of the isocyanate-terminated prepolymer to the mixture of the diamine components is for example 1:5 to 1:1.1, preferably 1:4 to 1:1.1.

The polyurethane may be diluted in a solvent such as for example an alcohol, preferably ethanol, or an ester such as for example n-propyl acetate, to achieve a clear solution.

The polyurethane preferably has an average molecular weight of 20000 bis 80000 g/mol, preferably 25000 bis 55000 g/mol. The polyurethane has a degree of urethanization of 20% to 30% for example.

The employed printing inks are adaptable to the needs of different types of plastics substrates and/or application processes.

In addition to the at least one polyurethane the employed printing comprises constituents typically employed for certain printing processes, in particular gravure printing processes, flexographic printing processes or intaglio printing processes. The primary constituents in addition to the at least one polyurethane are at least one pigment and/or at least one dye, at least one solvent and optionally additional additives.

In the employed printing ink a resin such as for example nitrocellulose may be used as a carrier for the dye or the pigment. Solvents that may be employed include typically employed solvents such as for example alcohols, in particular ethanol or isopropanol.

Suitable additives include for example surface-active substances/surfactants, plasticizers, stabilizers or waxes.

According to the invention one or more printing inks containing at least one polyurethane as binder may be applied to the first polymeric layer. At least one printing ink containing a binder distinct from polyurethane may also be present in addition to the at least one printing ink containing at least one polyurethane and binder.

Processes for applying the at least one printing ink to the first polymeric layer are known to those skilled in the art, for example gravure printing processes, flexographic printing processes or intaglio printing processes.

The multilayer laminate according to the invention comprises at least one second layer which is at least partially bonded, using a polyurethane dispersion as adhesive, to the side of the first polymeric layer coated with at least one printing ink containing at least one polyurethane as binder.

The second layer present according to the invention may likewise contain or consist of polymeric materials. Suitable polymeric materials for the second layer are selected from polymeric materials, in particular film selected from polyethylene (PE), in particular LDPE, LLDPE, HDPE, polypropylene (PP), in particular in the form of unoriented film (cPP), uniaxially oriented film (oPP) or biaxially oriented film (BOPP), from polyamide (PA), polyesters, in particular polyethylene terephthalate (PET), polyacetate, cellophane, polylactide (PLA) and mixtures thereof. According to the invention the second polymeric layer particularly preferably consists of polyethylene terephthalate, polypropylene or polyamide; more preferably the second polymeric layer is a polyethylene terephthalate, polypropylene or polyamide film. The second layer may optionally be provided with a lubricant, as set out above.

The second layer may optionally be formed from further non-polymeric materials, for example metals, in particular aluminum, or paper or combinations thereof. The present invention preferably relates to the multilayer laminate according to the invention, wherein the at least one further layer is a polymeric layer or a layer composed of at least one metal, preferably aluminum.

It is particularly preferable according to the invention when the second layer of the multilayer laminate consists of a metal, in particular of aluminum.

If the second layer consists of or contains polymeric material the second layer generally has a thickness of 5 to 200 µm, preferably 12 to 60 µm. A second layer composed of paper generally has a thickness of 5 to 200 µm, preferably between 10 to 50 µm.

In the preferred case where the second layer according to the invention consists of or contains a metal, in particular aluminum, it generally has a thickness of 5 to 100 µm, preferably 9 to 15 µm.

The dimensions in terms of width and length of the second layer are not limited according to the invention but are preferably informed by the dimensions of the first polymeric layer and any further layers that are present. The second layer therefore preferably has the same dimensions as the first polymeric layer and the total multilayer laminate according to the invention.

The second layer may be transparent or nontransparent, i.e. dyed with known dyes for example. The second layer may moreover be printed or unprinted. Since the second layer preferably consists of a metal, more preferably of aluminum, it is preferably nontransparent.

The present invention preferably relates to the multilayer laminate tube according to the invention, wherein the first polymeric layer consists of a polyester and the second layer consists of aluminum.

The layers present in the multilayer laminate according to the invention, in particular the first polymeric layer, the optionally present further layers and the second layer, optionally printed with printing ink containing at least polyurethane or vapor-deposition coated with aluminum or silicon dioxide, may according to the invention be combined with one another in any conceivable fashion, in particular sequence. The construction of the multilayer laminate according to the invention is informed for example by the requirements in terms of barrier effect and costs.

It is preferable according to the invention when the multilayer laminate according to the invention comprises a first polymeric layer which is coated on at least one side with at least one printing ink containing at least one polyurethane as binder and a second layer which is at least partially bonded, using a polyurethane dispersion as adhesive, to the side of the first polymeric layer coated with at least one printing ink containing at least one polyurethane as binder.

It is preferable according to the invention when the multilayer laminate according to the invention comprises a first polymeric layer which is coated on one side with at least one printing ink containing at least one polyurethane as binder and a second layer, in particular composed of a metal, preferably composed of aluminum, which is at least partially coated with at least one printing ink containing at least one polyurethane as binder and a third polymeric layer which is at least partially bonded, preferably using an adhesive, in particular a polyurethane dispersion, to the side of the second layer not bonded to the first polymeric layer.

If the multilayer laminate according to the invention comprises layers having low-energy surfaces, i.e. surfaces having a surface energy <38 mN/m, it is preferable according to the invention when these are subjected to a pretreatment with atmospheric pressure plasma (corona). Such a pretreatment may be carried out for the first polymeric layer immediately before application of the polyurethane dispersion as adhesive or for the second layer before introduction into the laminator.

The at least two layers of the multilayer laminate according to the invention are bonded with a polyurethane dispersion as adhesive. It is preferable according to the invention when the adhesive employed is at least one 1K (1-component) polyurethane dispersion. According to the invention this is to be understood as meaning that an adhesive dispersion that does not require crosslinking with a further component before application to the at least one polymeric layer is employed.

It is preferable according to the invention when the adhesive employed is at least one polyurethane dispersion which is a mixture of at least one aqueous polyurethane dispersion (I) and at least one aqueous dispersion of at least one hydrophilized polycarbodiimide (II).

Aqueous polyurethane dispersions (I) in the context of the present invention are dispersions of polyurethane-polyurea polymers in water. In the context of the present invention, the term "polyurethane" relates to polymeric compounds having polyurethane and/or polyurea groups.

Polyurethanes preferably employed according to the invention contain as synthesis components:
(A) at least one amorphous polyester polyol having a molecular weight of at least 500 g/mol,
(B) at least one di- and/or polyisocyanate component,
(C) at least one compound selected from the group consisting of monohydric to trihydric alcohols which additionally contain at least one ionic group or at least one group convertible into an ionic group,
(D) at least one compound selected from the group consisting of neutralizing amines and ammonia,
(E) at least one diamine as chain extender and
(F) optionally other isocyanate-reactive compounds.

Amorphous solids in the context of the present invention are solids whose constituent units are not arranged in crystal lattices, i.e. are not crystalline. According to the invention amorphous polyesters are in particular polyesters which in a DSC measurement according to DIN 65467-1999-03 at a heating rate of 20 K/min show no melting peak in the temperature range from −30° C. to +100° C.

The polyurethane polymer preferably contains at least one amorphous polyester polyol, preferably polyesterdiol, in an amount of at least 20% by weight, preferably at least 40% by weight, particularly preferably at least 60% by weight, in each case based on the polyurethane polymer. An upper limit for the amount of at least one amorphous polyester polyol in the polyurethane polymer is preferably at most 90% by weight, for example at most 88% by weight, but may also be more than 90% by weight.

The at least one amorphous polyester polyol, preferably polyester diol, preferably has an average molecular weight of at least 500 g/mol. The average molecular weight is particularly preferably from 1000 to 4000 g/mol, particularly preferably from 1700 to 2500 g/mol, in each case determined by gel permeation chromatography (GPC) according to DIN 55672-1:2016-03 in tetrahydrofuran at 23° C. against a polystyrene standard.

The at least one amorphous polyester polyol employed according to the invention is preferably at least one amorphous polyesterdiol. It is preferable to use at least one aromatic dicarboxylic acid for producing the at least one amorphous polyesterdiol (A). Isophthalic acid and terephthalic acid are preferred. Isophthalic acid is particularly preferred.

In a preferred embodiment production of the at least one amorphous polyesterdiol (A) employs a mixture of carboxylic acids consisting of at least one aliphatic dicarboxylic acid having 3 to 10, preferably 4 to 8, carbon atoms and at least one aromatic dicarboxylic acid. The mixing ratio is preferably 0.5:1 to 2:1. A preferred dicarboxylic acid mixture is adipic acid/isophthalic acid, in particular in a ratio of 0.5:1 to 2:1.

Polyhydric alcohols that may be employed to produce the at least one amorphous polyesterdiol (A) include for example ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol and polybutylene glycols. Preference is given to alcohols of general formula HO—$(CH_2)_x$—OH, wherein x is an integer from 1 to 20, preferably an even number from 2 to 20. Preferred examples thereof are ethylene glycol, butane-1,4-diol, hexane-1,6-diol, octane-1,8-diol and dodecane-1,12-diol. Neopentyl glycol is also preferred. Butane-1,4-diol, hexane-1,6-diol and neopentyl glycol are particularly preferred.

Diisocyanates (B) include in particular diisocyanates of general formula $X(NCO)_2$, wherein X is an aliphatic hydrocarbon radical having 4 to 15 carbon atoms, a cycloaliphatic or aromatic hydrocarbon radical having 6 to 15 carbon atoms or an aliphatic hydrocarbon radical having 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl) methane (HMDI) such as the trans/trans, the cis/cis and the cis/trans isomers and also mixtures consisting of these compounds. Such diisocyanates are commercially available.

According to the invention preference is given to hexamethylene diisocyanate, tetramethylxylylene diisocyanate (TMXDI) and 1-isocyanato-3,5,5-trimethyl-5-isocyanatomethylcyclohexane (IPDI), particular preference being given to 1-isocyanato-3,5,5-trimethyl-5-isocyanatomethylcyclohexane (IPDI).

It will be appreciated that it is also possible to co-use proportions of higher-functionality polyisocyanates known per se in polyurethane chemistry, or else modified polyisocyanates known per se and for example comprising carbodiimide, allophanate, isocyanurate, urethane and/or biuret groups, as component (B).

Preference is given to polyisocyanates comprising isocyanurate and/or biuret groups which are co-used to a small extent. Commercially available compounds are for example the isocyanurate or the biuret of hexamethylene diisocyanate.

Suitable components (C) which additionally contain at least one ionic group or at least one group convertible into an ionic group are for example mono- to trihydric alcohols, monoaminocarboxylic acids and/or diamineocarboxylic acids.

The mono- to trihydric alcohols (C) contain in particular anionic groups such as sulfonate, carboxylate and phosphate groups.

The term ionic groups shall also encompass groups that may be converted into ionic groups. Accordingly, also the carboxylic acid, sulfonic acid or phosphoric acid groups convertible into ionic groups by neutralization are regarded as ionic groups. Dihydroxycarboxylic acids and diaminocarboxylic acids are preferred as compound (C). Dihydroxycarboxylic acids, in particular dimethylolpropionic acid (DMPS) and dimethylolbutyric acid (DMBS) are very particularly preferred.

Ammonia and tertiary amines for example are suitable as component (D). Particularly suitable and preferred tertiary amines are triethylamine, dimethylcyclohexylamine and ethyldiisopropylamine.

It is also possible to employ other amines for salt formation, for example diethanolamine, triethanolamine, dimethylethanolamine, methyldiethanolamine, aminomethylpropanol and also mixtures of the amines cited and also other amines.

Ammonia and triethylamine are particularly preferred as (D). Ammonia is very particularly preferred. A portion of the ammonia initially reacts with the NCO groups present in the prepolymer consisting of components (A), (B) and (C) by addition and chain termination, the remainder reacting as neutralizing amine. When using ammonia the number of remaining NCO groups and thus the ratio between chain extension and chain termination can be varied by prior reaction of the prepolymer with a diamine as chain extender (E). This allows the molar weight of the polymer to be adjusted. When using ammonia the prepolymer is advantageously initially reacted with component (E), with ammonia being added as component (D) only subsequently.

Examples of diamines (E) are 1,2-ethanediamine (ethylenediamine), 1,6-hexamethylenediamine, 1-amino-3,3,5-trimethyl-5-aminomethylcyclohexane (isophorondiamine), piperazine, 1,4-diaminocyclohexane and bis(4-aminocyclohexyl)methane. Adipic dihydrazide, hydrazine, and hydrazine hydrate are additionally suitable. It will be appreciated that it is also possible to use mixtures of two or more of the mentioned, optionally also together with unmentioned, compounds D).

Preferred components (E) are ethylene diamine and isophoronediamine. Ethylenediamine is very particularly preferred.

In a very particularly preferred embodiment of the present invention ammonia is used as component (D) and ethylenediamine as component (E).

Suitable other isocyanate-reactive compounds (F) in principle include all compounds distinct from (A) to (E) that are distinct from isocyanate-reactive compounds, for example diols with a molecular weight of 62 to 499 g/mol, crystalline polyester diols, polymer diols such as polyethers, lactones or polycarbonates, monools, monoamines and polyamines.

Production of the polyurethane dispersions employed according to the invention may employ any processes known from the prior art, for example emulsifier-shear force, acetone, prepolymer mixing, melt emulsification, ketimine and solid-state spontaneous dispersion methods or derivatives thereof. A summary of these methods can be found in Methoden der organischen Chemie [Methods of Organic Chemistry] Houben-Weyl, Erweiterungs- and Folgebände zur 4. Auflage [Expansion and Supplementary Volumes for the 4th Edition], volume E20, H. Bartl and J. Falbe, Stuttgart, New York, Thieme 1987, pages 1671 to 1682. Preference is given to the melt emulsification, prepolymer mixing, and acetone methods. Particular preference is given to the acetone method. The use and implementation of the acetone method is prior art and is known to the person skilled in the art from EP 0 232 778 for example.

The polyurethane dispersion employed according to the invention has a solids content of 35% to 48% by weight, preferably 38% to 45% by weight.

The aqueous dispersion of a hydrophilized polycarbodiimide (II) in the context of the present invention is a crosslinking agent comprising carbodiimide groups which is dispersed, emulsified, dissolved or dispersible, emulsifiable and/or soluble in water.

According to the invention preference is given to crosslinkers containing carbodiimide structures containing on average 3 to 20, particularly preferably 4 to 8, carbodiimide structural units per molecule.

Such carbodiimide crosslinkers are obtainable for example by carbodiimidization of diisocyanates such as for example tetramethylene diisocyanate, methylpentamethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane, 4,4'-diisocyanatodicyclohexylpropane-(2,2), 1,4-diisocyanatobenzene, 2,4-diisocyanatotoluene, 2,6-diisocyanatotoluene, 4,4'-diisocyanatodiphenylmethane, 2,2'- and 2,4'-diisocyanatodiphenylmethane, tetramethylxylylene diisocyanate, p-xylylene diisocyanate, p-isopropylidene diisocyanate, optionally with concomitant use of monofunctional isocyanates such as for example stearyl isocyanate, phenyl isocyanate, butyl isocyanate, hexyl isocyanate or/and higher-functionality isocyanates such as trimers, uretdiones, allophanates, biurets of the exemplary diisocyanates mentioned and subsequent, simultaneous or even prior reaction with hydrophilizing components, for example mono- or difunctional polyethers based on ethylene oxide polymers or ethylene oxide/propylene oxide copolymers started with alcohols or amines.

Preferred carbodiimides are obtained by carbodiimidization of 1-isocyanato-3,3,5-trimethyl-5-isocyanatomethylcyclohexane and/or 4,4'-diisocyanatodicyclohexylmethane.

The use of mixed carbodiimides, which comprise for example carbodiimides based on different isocyanates, is likewise possible.

Examples of suitable carbodiimides are for example Carbodilite® SV-02, Carbodilite® V-02-L2, Carbodilite® E-02, all from Nisshinbo Industries, Tokyo, Japan, and Desmodur® XP 2802 from Covestro Deutschland AG. Preferred carbodiimides are Carbodilites® V-02-L2 and Desmodur XP® 2802, Desmodur XP® being particularly preferred.

Suitable carbodiimides likewise include aqueous carbodiimide dispersions/carbodiimide emulsions/carbodiimide solutions and/or water-dispersible carbodiimides containing reaction products of a) at least one carbodiimide having on average 3 to 20, preferably 4 to 8, carbodiimide structural units based on difunctional isocyanates, in particular Desmodur® W, Desmodur® I, Desmodur® H and/or Desmodur® T (all from Bayer MaterialScience, Germany) and b) hydrophilic components such as for example at least one hydroxy-functional polyether based on ethylene oxide or based on ethylene and propylene oxide, for example methoxypolyethylene glycols, ethoxypolyethylene glycols, butoxypolyethylene glycols, each having molecular weights of 350 to 3000 g/mol, such as Carbowax® MPEG 750, MPEG 550, MPEG 350, all from DOW Chemical Company, USA, Polyether LB 25 from Bayer MaterialScience, Germany and/or corresponding amino-functional polyethers and/or ionic hydrophilic substances such as salts of aminocarboxylic acids, hydroxycarboxylic acids or aminosulphonic acids, for example dimethylolpropionic acid, dimethylolbutyric acid, hydroxypivalic acid, aminoethanesulfonic acid, c) optionally other hydroxy- and/or amino-functional and/or other isocyanate-reactive compounds such as for example monoalcohols such as butyl glycol, butyl diglycol, ethoxydiglycol, methoxypropanol, methoxyglycol, methanol, benzyl alcohol, fatty alcohols, 2-ethylhexanol, stearyl alcohol, oleyl alcohol, ethanol, butanol, isopropanol, hexanol, cyclohexanol, octanol, pentanol and/or monoamines, oximes, lactams such as diethylamine, diisopropylamine, triazole, dimethyltriazole, dimethylpyrazole, morpholine, butanone oxime, caprolactam, tert-butyl-benzylamine and/or dialkyl malonate, acetoacetic ester, cyclopentanone carboxyalkyl ester and/or diols, diamines, amino alcohols, triols such as for example trimethylolpropane, glycerol, neopentyl glycol, butanediol, ethylene glycol, cyclohexanediol, cyclohexanedimethanol, propylene glycol, diethylene glycol, dipropylene glycol, triethylene glycol, tripropylene glycol, ethanolamine, diethanolamine, isopropanolamine, diisopropanolamine, triethanolamine, hydroxyethylethylenediamine, ethylenediamine, isophoronediamine, hexamethylenediamine, hydrazine.

Components a), b) and c) may be reacted in any order, optionally also in the presence of solvents.

Carbodiimides ii) are preferably reaction products of 50% to 97% by weight of component a), 3% to 40% by weight of component b) and 0% to 25% by weight of component c), wherein components a), b) and c) in each case sum to 100% by weight.

The carbodiimides are particularly preferably reaction products of 60% to 90% by weight of component a), 5% to 27% by weight of component b) and 0.5% to 15% by weight of component c), wherein components a), b) and c) in each case sum to 100% by weight.

The carbodiimides are producible by known processes. Suitable catalysts include for example heterocyclic phosphorus-containing compounds, metal carbonyls phospholines, phospholenes, and phospholidines and also oxides and sulfides thereof.

It is preferable when a carbodiimide is initially reacted by heating at least one at least difunctional diisocyanate in the presence of a suitable catalyst, for example phospholine oxide, to 100° C. to 250° C. to eliminate carbon dioxide until the desired conversion is achieved and this carbodiimide is then reacted in a further reaction step with component b) and optionally simultaneously or subsequently with component c) and optionally subsequently dispersed, emulsified or dissolved.

The aqueous dispersion of the hydrophilized polycarbonate employed according to the invention has a solids content of for example 37% to 42% by weight.

The aqueous polyurethane dispersion employed as adhesive according to the invention preferably contains 70% to 99% by weight of the polyurethane dispersion (I) according to the invention and 1% to 30% by weight of the aqueous dispersion of the hydrophilized polycarbodiimide (II). A polyurethane dispersion particularly preferably employed as adhesive contains 80% to 97% by weight of the polyurethane dispersion (I) according to the invention and 3% to 20% by weight of the aqueous dispersion of the hydrophilized polycarbodiimide (II) A polyurethane dispersion very particularly preferably employed as adhesive contains 85% to 92% by weight of the polyurethane dispersion (I) according to the invention and 8% to 15% by weight of the aqueous dispersion of the hydrophilized polycarbodiimide (II).

The aqueous polyurethane dispersion employed as adhesive may be produced by simple mixing of the components (I) and (II). The aqueous polyurethane dispersion (I) is initially charged and the aqueous dispersion of the hydrophilized polycarbodiimide (II) is added with stirring. The adhesive dispersions are storage stable at least over several hours and are therefore amenable to 1-component processing.

The aqueous polyurea dispersion employed as adhesive according to the invention may be employed alone or with binders, auxiliaries and additive substances known in coatings and adhesives technology such as UV absorbers and sterically hindered amines (HALS), also antioxidants, fillers and auxiliaries, for example antisettling agents, defoaming and/or wetting agents, flow control agents, reactive diluents, plasticizers, catalysts, auxiliary solvents and/or thickeners and additives, for example pigments, dyes or matting agents. Tackifiers may also be added.

The additives may be added to the adhesive employed according to the invention immediately before processing. However, it is also possible to add at least a portion of the additives before or during the dispersing of the polyurethane.

The selection and the metered addition of these substances, which can be added to the individual components and/or to the whole mixture, are known in principle to those skilled in the art and may be determined without unduly high effort, tailored to the specific application, by simple preliminary experiments.

The present invention further relates to a process for producing the multilayer laminate according to the invention, at least comprising the steps of:
(A) providing at least a first polymeric layer which is coated on at least one side with at least one printing ink containing at least one polyurethane as binder,
(B) applying a polyurethane dispersion as adhesive to the first polymeric layer,
(C) contacting the first polymeric layer from step (B) with at least one second layer to obtain the multilayer laminate according to the invention.

The individual steps of the process of the invention are described in detail hereinbelow.

Production of the multilayer laminate according to the invention is especially effected in a semi-continuous dry lamination process.

Step (A) comprises providing the at least one first polymeric layer which is coated on at least one side, at least partially or completely, with at least one printing ink containing at least one polyurethane as binder.

According to the invention it is possible for only one first polymeric layer to be provided in step (A). It is also possible for a combination of the first polymeric layer and further layers to be provided in step (A).

The first polymeric layer is coated on at least one side, at least partially or completely, with at least one printing ink containing at least one polyurethane as binder.

Processes for coating with a corresponding printing ink are known per se to those skilled in the art, for example gravure printing processes, flexographic printing processes or intaglio printing processes. The coating of the first polymeric layer may be monochromic or polychromic and may cover the layer only partially or completely.

The providing in step (A) of the process according to the invention is carried out for example by passing the first polymeric layer from an unrolling station through an applicator.

Step (B) of the process according to the invention comprises the applying of a polyurethane dispersion as an adhesive to the first polymeric layer.

Step (B) may generally be carried out in any way known to those skilled in the art, for example step (B) may comprise applying the adhesive to the first polymeric layer using a gravure roller or smooth roller. The roller rotation may be in the direction of motion of the first polymeric layer or in the reverse direction. After the roller application the adhesive layer may be treated for example with a rotating smoothing bar which generally results in a smoother adhesive layer. This allows the appearance of the adhesive layer to be improved especially in the case of transparent multilayer laminates.

Other suitable techniques for applying the polyurethane dispersion in step (B) are spray application, air knife application or curtain coating.

In step (B) the application rate of the polyurethane dispersions is adjusted such that after drying, i.e. after the evaporation of the water, 0.1 to 20 $g/m^2$, preferably 0.5 to 7 $g/m^2$, of polyurethane polymer are present on the first polymeric film.

After application of the polyurethane dispersion the coated first polymeric layer is preferably dried, in particular passed through a drying tunnel. In the drying tunnel the polyurethane dispersion is dried and all constituents volatile under the drying conditions are evaporated. The temperature in the drying tunnel is for example 50° C. to 200° C., preferably 70° C. to 90° C.

The belt speed in the drying step depends for example on the application rate of the dispersion, the polymer proportion in the dispersion, the length of the drying tunnel, the temperature in the drying tunnel, the air flow in the drying tunnel, the amount of feed air in the drying tunnel and the atmospheric humidity of the feed air. The belt speed is decisive for the economy of the process and is preferably 100 to 1000 m/min, preferably 150 to 300 m/min.

Step (C) of the process according to the invention comprises contacting the first polymeric layer from step (B) with at least one second layer to obtain the multilayer laminate according to the invention.

Step (C) of the process according to the invention is preferably carried out by laminating the first polymeric layer comprising the dried polyurethane polymer from step (B) after discharging from the drying tunnel with the second layer in a heatable laminator, where the roller pair preferably consists of a steel roller and a rubber roller. The second layer is the feed layer.

The pressure in step (C), in particular between the rollers in the laminating unit, is preferably 100 to 3000 KN/m², preferably 500 to 2000 kN/m². The temperature in step (C), in particular of the steel roller in the laminator, is 20° C. to 200° C., preferably 40° C. to 90° C.

After step (C) the obtained multilayer laminate according to the invention is wound and stored until further processing, i.e. until packaging of foodstuffs or feedstuffs.

The present invention further relates to the use of the multilayer laminate according to the invention for packaging foodstuffs or feedstuffs, in particular for treatments at high temperature, for example 90° C. to 140° C., for up to 60 min for example. Examples include the heating or cooking of the foodstuff in the packaging, so-called boil-in-bag, so-called hot-filling of the foodstuff, or steam sterilization of the foodstuff or feedstuff after filling into the multilayer laminate, the so-called retort process.

The present invention therefore preferably relates to the use according to the invention, wherein this is suitable for treatments at high temperature, in particular heating or cooking of the foodstuff in the packaging, so-called boil-in-bag, so-called hot-filling of the foodstuff or feedstuff, or steam sterilization of the foodstuff or feedstuff after filling into the multilayer laminate, the so-called retort process.

The present invention further relates to packaging containing a multilayer laminate according to the invention.

EXAMPLES

Raw Materials/Materials Used:
polyester film: Hostaphan® RNK 23 µm untreated, Mitsubishi Polyester Film, D-65203 Wiesbaden
Aluminum foil: pure aluminium foil alloy 8011 12 µm, Korff AG, CH-4538 Oberbipp, Switzerland
PVC printing ink: binder polyvinyl chloride, color white; solvent ethyl acetate
PU printing ink: Binder polyurethane; color white; solvent ethyl acetate Production of the Employed Polyurethane Dispersions:
PUD 1:
800.2 g of a polyester diol of adipic acid, isophthalic acid and 1,6-hexanediol having an OH number of 56 and 26.74 g of dimethylolpropionic acid were dewatered for 60 min at 90° C. and 50 mbar (a). The mixture was then initially homogenized at 80° C. for 15 min with constant stirring, subsequently 197.4 g of isophorone diisocyanate (IPDI) were added, the mixture was heated to 110° C. and the temperature was maintained at 110° C. After 1 h 15 min a constant isocyanate content of 2.35% by weight was achieved. To dissolve the prepolymer formed, 1540 g of acetone were added and the mixture was stirred at 48° C. for 20 minutes. The mixture was then neutralised, with stirring, at 48° C. with 15.13 g of triethylamine dissolved in 50 g of acetone. After 15 minutes a mixture of 10.35 g of ethylenediamine, 2.40 g of diethanolamine and 115 g of water were added and stirred for a further 30 min at 48° C. Subsequently the acetonic prepolymer mixture was admixed with vigorous stirring with 1460 g of water and dispersed at 48° C. for 20 minutes. Distillative removal of the acetone afforded an aqueous dispersion having a solids content of 40.0% by weight.

PUD 2:
909.4 g of a polyester diol of adipic acid, isophthalic acid and 1,6-hexanediol having an OH number of 56 and 30.4 g of dimethylolpropionic acid were dewatered for 60 min at 90° C. and 50 mbar (a). The mixture was then initially homogenized at 80° C. for 15 min with constant stirring, subsequently 224.4 g of isophorone diisocyanate (IPDI) were added, the mixture was heated to 110° C. and the temperature was maintained at 110° C. After 1 h 20 min a constant isocyanate content of 2.29% by weight was achieved. To dissolve the prepolymer formed, 1750 g of acetone were added and the mixture was stirred at 48° C. for 20 minutes. A solution of 15.64 g of ethylenediamine in 140 g of water was subsequently added and stirred for 30 minutes at 48° C. Subsequently, with stirring, at 48° C. and over 5 min 18.12 g of a 25% by weight aqueous ammonia solution were added dropwise and the resulting mixture stirred for a further 15 minutes. Subsequently the acetonic prepolymer mixture was admixed with vigorous stirring with 1640 g of water and dispersed at 48° C. for 20 minutes. Distillative removal of the acetone afforded an aqueous dispersion having a solids content of 40.2% by weight.

PUD 3:
909.4 g of a polyester diol of adipic acid, isophthalic acid and 1,6-hexanediol having an OH number of 56 and 30.4 g of dimethylolpropionic acid were dewatered for 60 min at 90° C. and 50 mbar (a). The mixture was then initially homogenized at 80° C. for 15 min with constant stirring, subsequently 224.4 g of isophorone diisocyanate (IPDI) were added, the mixture was heated to 110° C. and the temperature was maintained at 110° C. After 1 h 20 min a constant isocyanate content of 2.37% by weight was achieved. To dissolve the prepolymer formed, 1750 g of acetone were added and the mixture was stirred at 48° C. for 20 minutes. A solution of 17.82 g of ethylenediamine in 160 g of water was subsequently added and stirred for 30 minutes at 48° C. Subsequently, with stirring, at 48° C. and over 5 min 16.81 g of a 25% by weight aqueous ammonia solution were added dropwise and the resulting mixture stirred for a further 15 minutes. Subsequently the acetonic prepolymer mixture was admixed with vigorous stirring with 1625 g of water and dispersed at 48° C. for 20 minutes. Distillative removal of the acetone afforded an aqueous dispersion having a solids content of 40.1% by weight.

PUD 4:
800.2 g of a polyester diol of adipic acid, isophthalic acid and 1,6-hexanediol having an OH number of 56 and 26.74 g of dimethylolpropionic acid were dewatered for 60 min at 90° C. and 50 mbar (a). The mixture was then initially homogenized at 80° C. for 15 min with constant stirring, subsequently a mixture of 196.38 g of isophorone diisocyanate (IPDI) and 1.74 g of Desmodur N 3300 (trimer of hexamethylene diisocyanate; Covestro AG Deutschland) were added, the mixture was heated to 110° C. and the temperature was maintained at 110° C. After 1 h a constant isocyanate content of 2.35% by weight was achieved. To dissolve the prepolymer formed, 1540 g of acetone were added and the mixture was stirred at 48° C. for 20 minutes. A solution of 13.76 g of ethylenediamine in 124 g of water was subsequently added and stirred for 30 minutes at 48° C. Subsequently, with stirring, at 48° C. and over 5 min 18.45 g of a 25% by weight aqueous ammonia solution were added dropwise and the resulting mixture stirred for a further 15 minutes. Subsequently the acetonic prepolymer mixture was admixed with vigorous stirring with 1450 g of water and dispersed at 48° C. for 20 minutes. Distillative removal of the acetone afforded an aqueous dispersion having a solids content of 40.1% by weight.

Crosslinker:
  Desmodur XP 2802: about 40% by weight aqueous dispersion of polycarbodiimide having a carbodiimide content of about 1 DCC eq. (mmol/g), Covestro Deutschland AG Adhesive Dispersions:
  Example 1: 100 parts by weight PUD 1+13.5 parts by weight Desmodur XP 2802
  Example 2: 100 parts by weight PUD 2+13.5 parts by weight Desmodur XP 2802
  Example 3: 100 parts by weight PUD 3+13.5 parts by weight Desmodur XP 2802
  Example 4: 100 parts by weight PUD 4+13.5 parts by weight Desmodur XP 2802

Production of the Film Laminates:
  Labo Combi 400: Duplex laminator for laboratories from Nordmeccanica, Italy. The laminator has an inline corona station for the pre-treatment of low-energy film surfaces as well as a drying tunnel for evaporating the solvents and water.

Printing of the Polyester Film:
  The printing inks were applied to the polyester film using the Labo Combi 400. The polyester film was subjected to inline corona pretreatment before printing. The surface energy of the polyester film in all cases was >40 mN/m.
  The printing ink was adjusted to the processing viscosity with ethyl acetate. The application of the printing ink was carried out in the intaglio printing process using a gravure roller. The web speed was in each case 30 m/min. The film web coated with printing ink was then passed through the drying tunnel. The temperature in the drying time was 70° C. The application rate of the wholly printed layer after flashoff of the solvent was in each case adjusted to 2 g/m$^2$.

Production of Multilayer Laminates Composed of PET/Printing Ink/Adhesive/Aluminum Foil
  Manufacture of the multilayer laminates was carried out with the Labo Combi 400 apparatus. The aqueous adhesive dispersions according to examples 1 to 4, each having a polymer proportion of about 40% by weight, were applied to the printed side of the polyester film using a gravure roller. The thus-obtained adhesive layer was dried at 70° C. in a drying tunnel. The aluminum foil was then laminated with the adhesive-coated printed polyester film under pressure in the laminator heated to 40° C.

TABLE 1

Adhesive application rates

| Example | without printing ink | PVC ink | PU ink |
|---|---|---|---|
| 1 | 4.6 | 5.1 | 5.7 |
| 2 | 4.4 | 5.0 | 4.5 |
| 3 | — | — | 4.0 |
| 4 | — | — | 5.6 |

All data in g/m$^2$

Laminates of the following structure were obtained:

| | |
|---|---|
| V1 (comparison) | PET/adhesive from example 1 to 4/aluminum foil |
| V2 (comparison) | PET/wholly printed with PVC printing ink (application rate 2.0 g/m$^2$)/adhesive from example 1 to 4/aluminum foil |
| 3 (inventive) | PET/wholly printed with PU printing ink (application rate 2.0 g/m$^2$)/adhesive from example 1 to 4/aluminum foil |

Storage/Delamination Test:
  Tensile shear test on stored samples (film laminates): To this end samples were stored at 23° C./50% r.h. Laminate strength was determined after 1 week. In addition after 1 week, after a sterilization under the conditions 60 min @ 120° C. and 60 min at 134° C., the stored laminates were stored for a further 24 hours and the tensile shear strength tested.
  Storage and delamination tests were carried out on the obtained laminates V1, V2 or 3. The results are shown in table 2:

TABLE 2

Results of storage and delamination tests

| No. | Adhesive from example | Measurement after storage of the laminates at 23° C./50% r.h. | Laminates V1 [N/15 mm] | Laminates V2 [N/15 mm] | Laminates 3 [N/15 mm] |
|---|---|---|---|---|---|
| 5 | 1 | After 1 week | 2.5 | 5.3 | 5.0 |
| 6 | 1 | No. 5 + 24 h after 60 min @ 121° C. | F | DEL | 1.8f |
| 7 | 1 | No. 5 + 24 h after 60 min @ 134° C. | F | DEL | 0.7f |
| 8 | 2 | After 1 week | 5.0 | 1.2 | 5.4 |
| 9 | 2 | No. 8 + 24 h after 60 min @ 121° C. | 6.0 | DEL | 7.1 |
| 10 | 2 | No. 8 + 24 h after 60 min @ 134° C. | 5.2f | DEL | 1.6 |
| 11 | 3 | After 1 week | 5.8 | — | 10.2 |
| 12 | 3 | No. 11 + 24 h after 60 min @ 121° C. | — | — | 7.4 |
| 13 | 3 | No. 11 + 24 h after 60 min @ 134° C. | — | — | 3.8 |
| 14 | 4 | After 1 week | — | — | 6.2 |
| 15 | 4 | No. 14 + 24 h after 60 min @ 121° C. | — | — | 7.7f |
| 16 | 4 | No. 14 + 24 h after 60 min @ 134° C. | — | — | 3.8f |

DEL delamination
ftearoff during testing
F specimen already tears in/at the adhesive seam (before clamping)

The multilayer laminates V2 (with PVC printing ink) delaminate under conditions corresponding to treatment in a steam sterilizer, i.e. 60 minutes at 121° C. or 60 minutes at 134° C.

The multilayer laminates 3 (with PU printing ink) consistently achieve high values even under conditions corresponding to treatment in a steam sterilizer, i.e. 60 min. at 121° C. or 60 min. at 134° C.

The invention claimed is:
1. A multilayer laminate at least containing a first polymeric layer which is coated on at least one side with at least one printing ink containing at least one polyurethane as binder and a second layer which is at least partially bonded, using a polyurethane dispersion as adhesive, to the side of the first polymeric layer coated with the at least one printing ink containing the at least one polyurethane as binder, wherein the adhesive employed is at least one polyurethane dispersion which is a mixture of at least one aqueous polyurethane dispersion (I) and at least one aqueous dispersion of at least one hydrophilized polycarbodiimide (II).

2. The multilayer laminate as claimed in claim 1, wherein the material of the at least one first polymeric layer is selected from polyethylene (PE), polypropylene (PP), polyamide (PA), polyesters, polyacetate, cellophane, polylactide (PLA) and mixtures thereof.

3. The multilayer laminate as claimed in claim 1, comprising at least one further layer that is a polymeric layer or a layer composed of at least one metal.

4. The multilayer laminate as claimed in claim 1, wherein the adhesive employed is at least one 1K polyurethane dispersion.

5. The multilayer laminate as claimed in claim 1, wherein the first polymeric layer consists of a polyester and the second layer consists of aluminum.

6. A process for producing the multilayer laminate as claimed in claim 1, at least comprising the steps of:
 (A) providing at least a first polymeric layer which is coated on at least one side with at least one printing ink containing at least one polyurethane as binder,
 (B) applying a polyurethane dispersion as adhesive to the first polymeric layer, and
 (C) contacting the first polymeric layer from step (B) with at least one second layer to obtain the multilayer laminate.

7. The process as claimed in claim 6, wherein the adhesive employed in step (B) is least one polyurethane dispersion amenable to 1-component processing.

8. A method for preparing packaging for foodstuffs or feedstuffs comprising providing the multilayer laminate as claimed in claim 1.

9. The method as claimed in claim 8, the packaging configured for treatments at high temperature.

10. A packaging containing a multilayer laminate as claimed in claim 1.

11. The method as claimed in claim 9, wherein the packaging is configured for cooking of the foodstuff or feedstuff in the packaging, so-called boil-in-bag, so-called hot-filling of the foodstuff or feedstuff, or steam sterilization of the foodstuff or feedstuff after filling into the multilayer laminate, the so-called retort process.

* * * * *